(12) United States Patent
Yano (10) Patent No.: US 7,831,068 B2
(45) Date of Patent: Nov. 9, 2010

(54) IMAGE PROCESSING APPARATUS AND METHOD FOR DETECTING AN OBJECT IN AN IMAGE WITH A DETERMINING STEP USING COMBINATION OF NEIGHBORHOODS OF A FIRST AND SECOND REGION

(75) Inventor: Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 958 days.

(21) Appl. No.: 11/456,690

(22) Filed: Jul. 11, 2006

(65) Prior Publication Data

US 2007/0014433 A1    Jan. 18, 2007

(30) Foreign Application Priority Data

Jul. 13, 2005    (JP)    ............... 2005-204735

(51) Int. Cl.
*G06K 9/00*    (2006.01)
(52) U.S. Cl. ............... 382/117; 382/118; 382/115; 382/116
(58) Field of Classification Search ........... 382/116, 382/118
See application file for complete search history.

(56) References Cited

U.S. PATENT DOCUMENTS

2004/0021779 A1    2/2004    Yano

OTHER PUBLICATIONS

Rowley et al. (Neural Network-Based Face Detection, PAMI, IEEE, pp. 1-27, Jan. 1998: hereafter: "Rowley").*

Yang et al., "Detecting faces in Images: A Survey", IEEE Transactions on Pattern Analysis and Machine Intelligence, vol. 24, No. 1, Jan. 2002, pp. 34-58.

Chetverikov et al., "Multiresolution Face Detection", Theoretical Foundations of Computer Vision, Proceedings of the $V^{th}$ Workshop, Mar. 30-Apr. 3, 1992, pp. 132-140.

Rowley et al., "Neural network-based face detection", IEEE Transactions on Pattern Analysis and Machine Intelligence, vol. 20, No. 1, Jan. 1998.

Viola et al., "Rapid Object Detection using a Boosted Cascade of Simple Features", Proceedings of the IEEE Conference on Computer Vision and Pattern Recognition, 2001.

* cited by examiner

*Primary Examiner*—Tom Y Lu
*Assistant Examiner*—Thomas A Conway
(74) *Attorney, Agent, or Firm*—Fitzpatrick, Cella, Harper & Scinto (57) ABSTRACT

A luminance image which is formed by luminance components of an image is generated, and a plurality of reduced-scale images by recursively reducing the luminance image are generated. Positions of eye candidate regions from each of the reduced-scale images are detected, it is determined that whether or not a face candidate region which is specified by positions of the detected two eye candidate regions is a face pattern. If the face candidate region is determined not as the face pattern, neighboring regions in the neighborhood of the positions of the eye candidate regions in the face region are set. It is determined whether or not a face candidate region which is specified by a first position in one neighboring region and a second position in the other neighboring region as positions of eye candidate regions, is the face pattern.

8 Claims, 10 Drawing Sheets

IMAGE PROCESSING APPARATUS AND METHOD FOR DETECTING AN OBJECT IN AN IMAGE WITH A DETERMINING STEP USING COMBINATION OF NEIGHBORHOODS OF A FIRST AND SECOND REGION

BACKGROUND OF THE INVENTION

1. Field of the Invention

The present invention relates to a technique for detecting faces in images.

2. Description of the Related Art

An image processing method for automatically detecting a specific object pattern from an image is very useful, and can be utilized in determination of, e.g., a human face. Such method can be used in many fields such as an online meeting, man-machine interface, security, a monitor system for tracing human faces, image compression, and the like. As a technique for detecting faces from images, for example, "Detecting faces in Images: A Survey", IEEE TRANSACTIONS ON PATTERN ANALYSIS AND MACHINE INTELLIGENCE, VOL. 24, NO. 1, JANUARY 2002, proposes various methods. Of these methods, methods of detecting human faces by utilizing some remarkable features (two eyes, mouth, nose, and the like) and a unique geometric positional relationship among these features, symmetric features of human faces, features of skin colors of human faces, template matching, neural networks, and the like have been proposed.

As an example of the former type, "Multiresolution Face Detection", Theoretical Foundations of Computer Vision, vol. 69, 1993, has proposed a method of detecting faces in images based on detection of blobs and streaks. That is, by utilizing the fact that eyes are dark features (dark blobs), cheekbones and a nose are light features (light blobs), and the outlines of eyebrows, a mouth, and a face are linear edges (streaks), these features are detected from an image, and a face is detected in consideration of a geometric positional relationship among these features. Also, blobs as relatively simple features are detected from a low-resolution image, and blobs and streaks are detected from a high-resolution image with high precision, thus speeding up processing. However, in such method based on feature detection, the detection results are readily influenced by changes in postures of objects, illumination conditions, noise components of images, and the like, and it may be difficult to perform detection with high precision under these conditions.

On the other hand, a method proposed by "Neural network-based face detection", IEEE TRANSACTIONS ON PATTERN ANALYSIS AND MACHINE INTELLIGENCE, VOL. 20, NO. 1, JANUARY 1998, detects a face pattern in an image using neural networks. A face detection method according to this reference will be briefly described below.

Image data including a face is loaded onto a memory, and a predetermined region that matches the face is extracted from the image. Then, one output is obtained by arithmetic operations using neural networks to have the distribution of pixel values of the extracted region as an input. At this time, the weights and thresholds of the neural networks have been learned based on a huge number of face image patterns and non-face image patterns. For example, when the output of the neural networks is 0 or more, a face is determined; otherwise, a non-face is determined.

Figure 3:
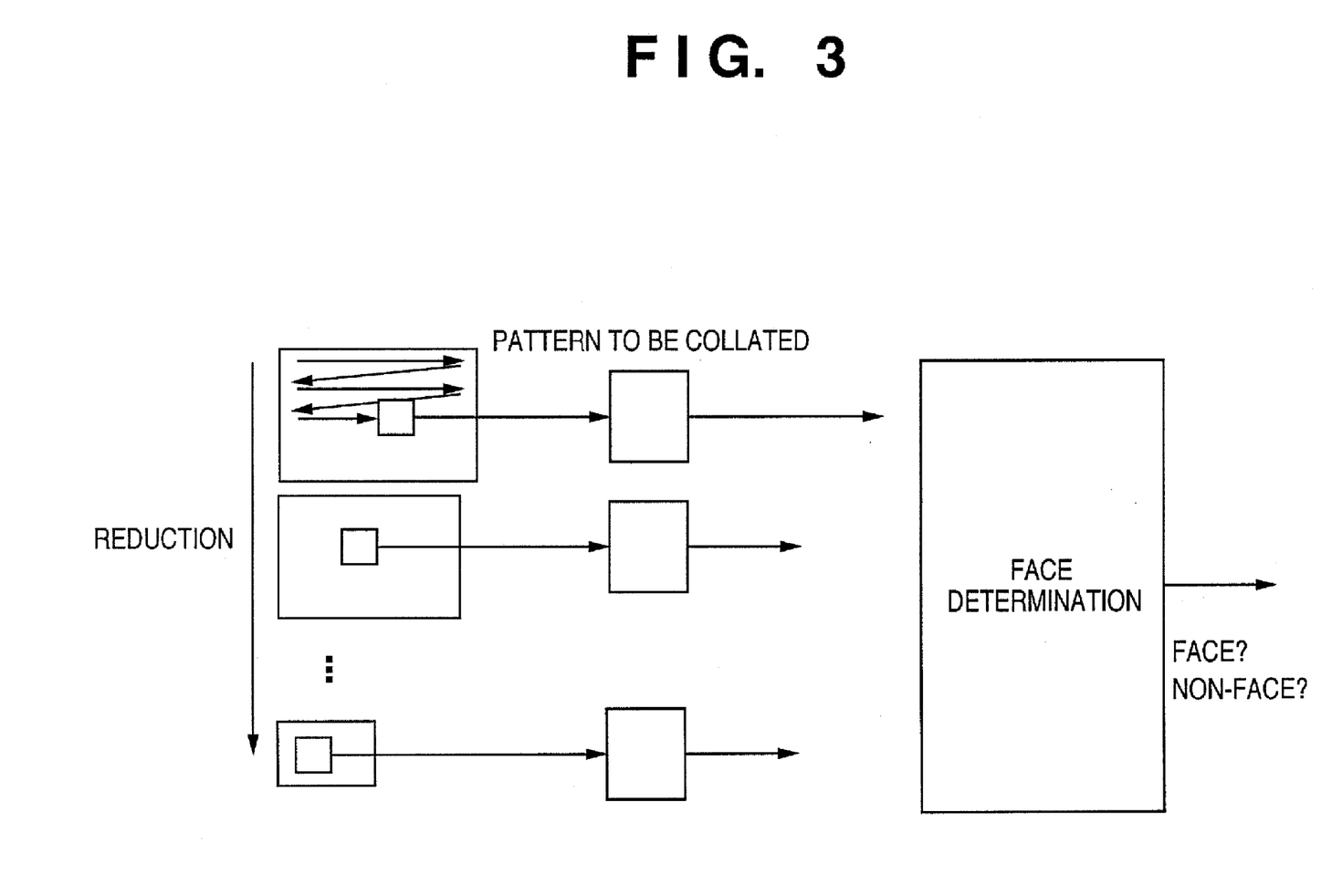
FIG. 3 is a view for explaining processing for collating object patterns for reduced-scale images with various sizes.

By sequentially scanning the extraction position of an image pattern to be collated with a face as the input to the neural networks from the entire image in the vertical and horizontal directions, as shown in, e.g., FIG. 3, a face is detected in the image. To cope with detection of faces with various sizes, the loaded image is sequentially reduced in size at a predetermined ratio, as shown in FIG. 3, and the above scan of face detection is applied to the reduced-scale image. Although such method based on object pattern collation can execute detection relatively robust against changes in postures of objects, illumination conditions, noise components of images, and the like, since patterns extracted from the image are collated cyclopaedically, a huge computation time is required.

To solve the above problems, a method of detecting an object by combining the advantages of the above two methods may be used. By the method according to "Multiresolution Face Detection", Theoretical Foundations of Computer Vision, vol. 69, 1993, eye candidates are extracted from an image, and a face candidate is set to have two eyes selected from the eye candidates. Then, an image pattern is extracted from the set candidate, and face determination is made using neural networks by the method according to "Neural network-based face detection", IEEE TRANSACTIONS ON PATTERN ANALYSIS AND MACHINE INTELLIGENCE, VOL. 20, NO. 1, JANUARY 1998.

Figure 6A:
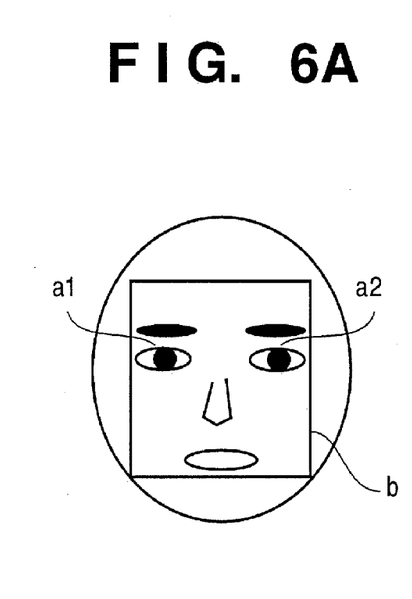
FIGS. 6A to 6D are views for explaining conventional face detection.
Figure 6B:
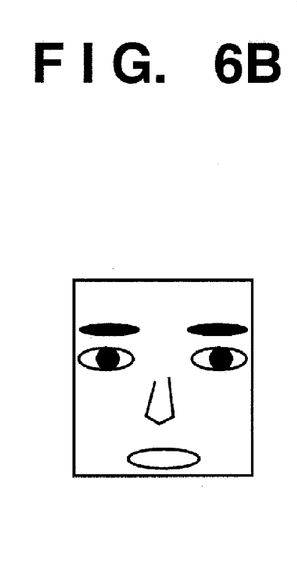
Figure 6C:
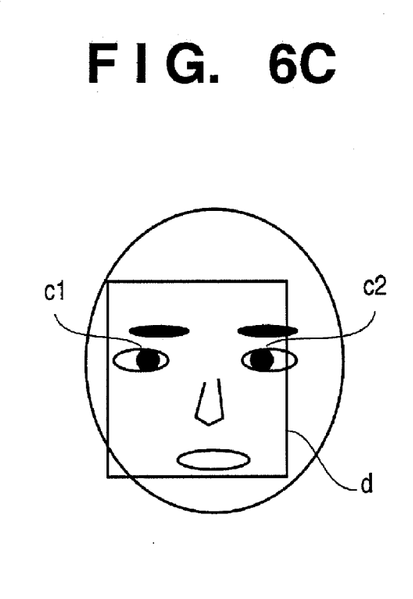

FIGS. 6A to 6D show face detection based on this processing method. FIG. 6A shows a face image as a part of an input image, and positions a1 and a2 of eyes are extracted from this face image. A face region b is set based on the positional relationship between a1 and a2, and the entire face. This face region b is extracted as an image pattern shown in FIG. 6B and is collated. However, for example, when the line of sight of an object deviates from front direction, as shown in FIG. 6C, since dark blobs c1 and c2 are extracted as the eye positions. Thus, a face region is set as shown in FIG. 6C, and collation is done using an image pattern shown in FIG. 6D.

In this case, since the face positions in collation patterns are different, the image pattern is not recognized as a face pattern, and a face may not be detected normally. Note that such situation is likely to occur not only when the line of sight of an object deviates but also when, for example, the detection positions of dark parts deviate due to the influence of illumination or when eyebrows and frames of spectacles are mistaken for eyes.

Therefore, in the above prior arts, the processing for detecting an object pattern from an image cannot achieve both high precision and short computation time. Also, even in a simple combination of the above prior arts, the detection precision of an object pattern impairs.

SUMMARY OF THE INVENTION

The present invention has been made in consideration of the above problems, and has as its object to provide a technique for detecting an object in an image at high speed and with high precision.

In order to achieve an object of the present invention, for example, an image processing method of the present invention comprises the following arrangement.

That is, an image processing method for detecting a predetermined object from an image, comprising:

a detection step of detecting positions of feature candidate regions as candidates of two partial features of the predetermined object from the image;

a first determination step of determining whether or not an object candidate region which is specified by positions of the two feature candidate regions detected in the detection step is a region of the predetermined object;

a setting step of setting neighboring regions in the neighborhood of the positions of the feature candidate regions if the object candidate region is determined not as the region of the predetermined object in the first determination step;

a second determination step of determining whether or not an object candidate region which is specified by a first position in one neighboring region and a second position in the other neighboring region as positions of feature candidate regions, is the region of the predetermined object; and an output step of outputting data of some or all of object candidate regions which are determined as the region of the predetermined object in the first or second determination step, respectively.

In order to achieve an object of the present invention, for example, an image processing apparatus of the present invention comprises the following arrangement.

That is, an image processing apparatus for detecting a predetermined object from an image, comprising:

detection unit adapted to detect positions of feature candidate regions as candidates of two partial features of the predetermined object from the image;

first determination unit adapted to determine whether or not an object candidate region which is specified by positions of the two feature candidate regions detected by said detection unit is a region of the predetermined object;

setting unit adapted to set neighboring regions in the neighborhood of the positions of the feature candidate regions if the object candidate region is determined not as the region of the predetermined object by said first determination unit;

second determination unit adapted to determine whether or not an object candidate region which is specified by a first position in one neighboring region and a second position in the other neighboring region as positions of feature candidate regions, is the region of the predetermined object; and output unit adapted to output data of some or all of object candidate regions which are determined as the region of the predetermined object by said first or second determination unit, respectively.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

First Embodiment

An image processing apparatus according to this embodiment comprises a computer such as a PC (personal computer), WS (workstation), or the like, and detects predetermined objects included in images input in various input modes such as images input from an image sensing device such as a digital camera or the like, images downloaded from an external device via a network such as the Internet or the like, images input by reading from storage media such as a CD-ROM, DVD-ROM, and the like. Note that this embodiment uses human faces as objects, but other objects may be used.

Figure 10:
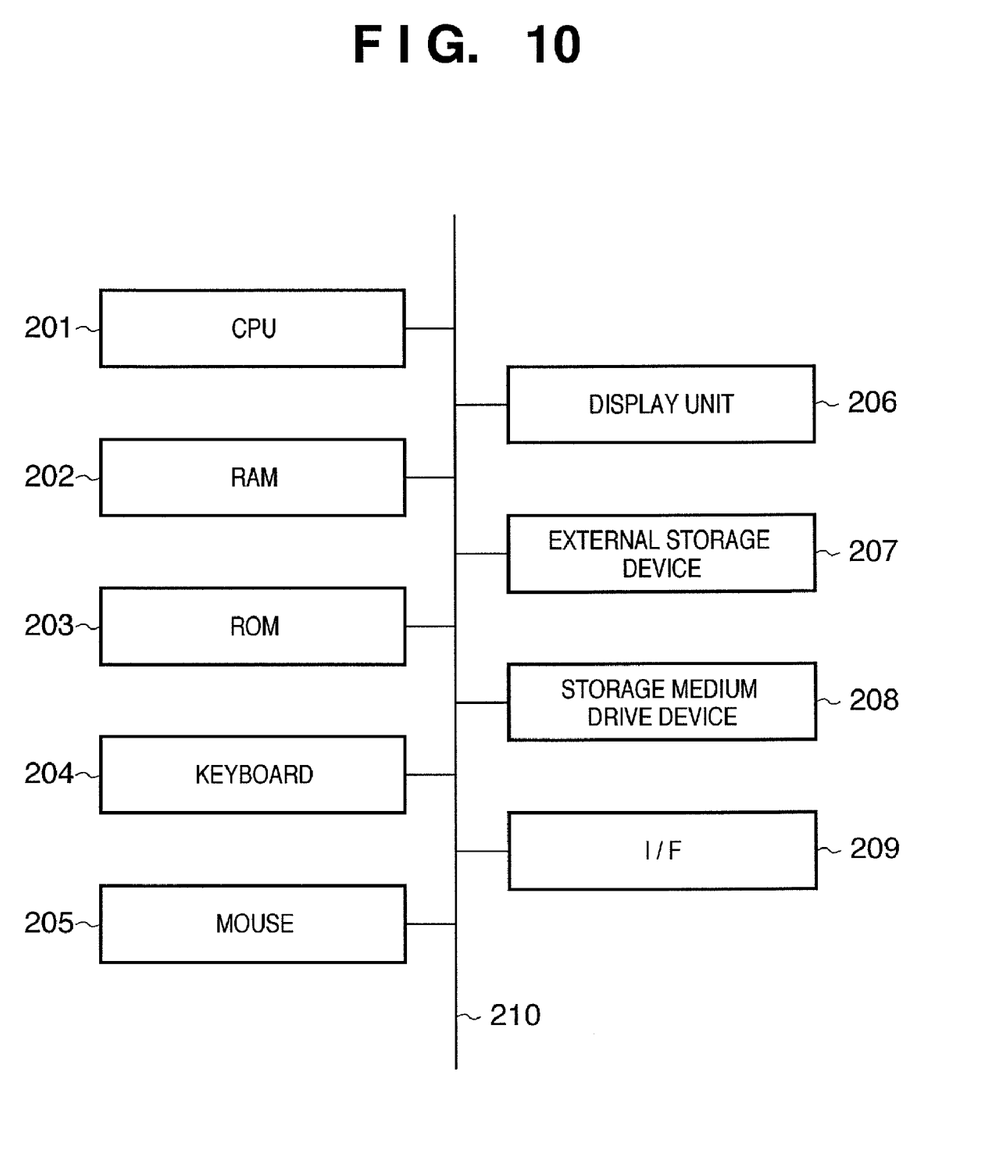
FIG. 10 is a block diagram showing the hardware arrangement of a computer which can be applied to the image processing apparatus according to the first embodiment of the present invention.

The image processing apparatus according to this embodiment, which implements such processing, will be described first. FIG. 10 is a block diagram showing the hardware arrangement of a computer which can be applied to the image processing apparatus according to this embodiment.

A CPU 201 controls the overall computer using programs and data stored in a RAM 202 and ROM 203, and executes respective processes (to be described later) implemented by the computer.

A RAM 202 can provide various areas such as an area for temporarily storing programs and data read out from an external storage device 207 and storage medium drive device 208, an area for temporarily storing data externally received via an I/F 209, a work area used when the CPU 201 executes various processes, and the like.

A ROM 203 stores a boot program, setting data of this computer, and the like.

A keyboard 204 and mouse 205, can input various instructions to the CPU 201, respectively, when they are operated by the operator of the computer.

A display unit 206 which comprises a CRT, liquid crystal display, or the like, and displays the processing results of the CPU 201 by means of text, images, and the like.

An external storage device 207 comprises a large-capacity information storage device such as a hard disk drive device or the like. The external storage device 207 stores an OS (operating system), and programs and data which make the CPU 201 execute processes to be described later to be implemented by the computer. These programs and data are read out onto the RAM 202 as needed under the control of the CPU 201.

A storage medium drive device 208 reads out programs and data recorded in a storage medium such as a CD-ROM, DVD-ROM, or the like, and outputs them to the RAM 202, external storage device 207, and the like. Note that some of programs and data stored in the external storage device 207 may be recorded in the storage medium. In this case, when these stored programs and data are used, the storage medium drive device 208 reads out the programs and data recorded in this storage medium, and outputs them to the RAM 202.

An I/F (interface) 209 can be connected with a network line of the Internet, a LAN, or the like.

A bus 210 interconnects the aforementioned units.

Note that the input modes of images to the computer are not particularly limited, and various other modes may be used.

Figure 1:
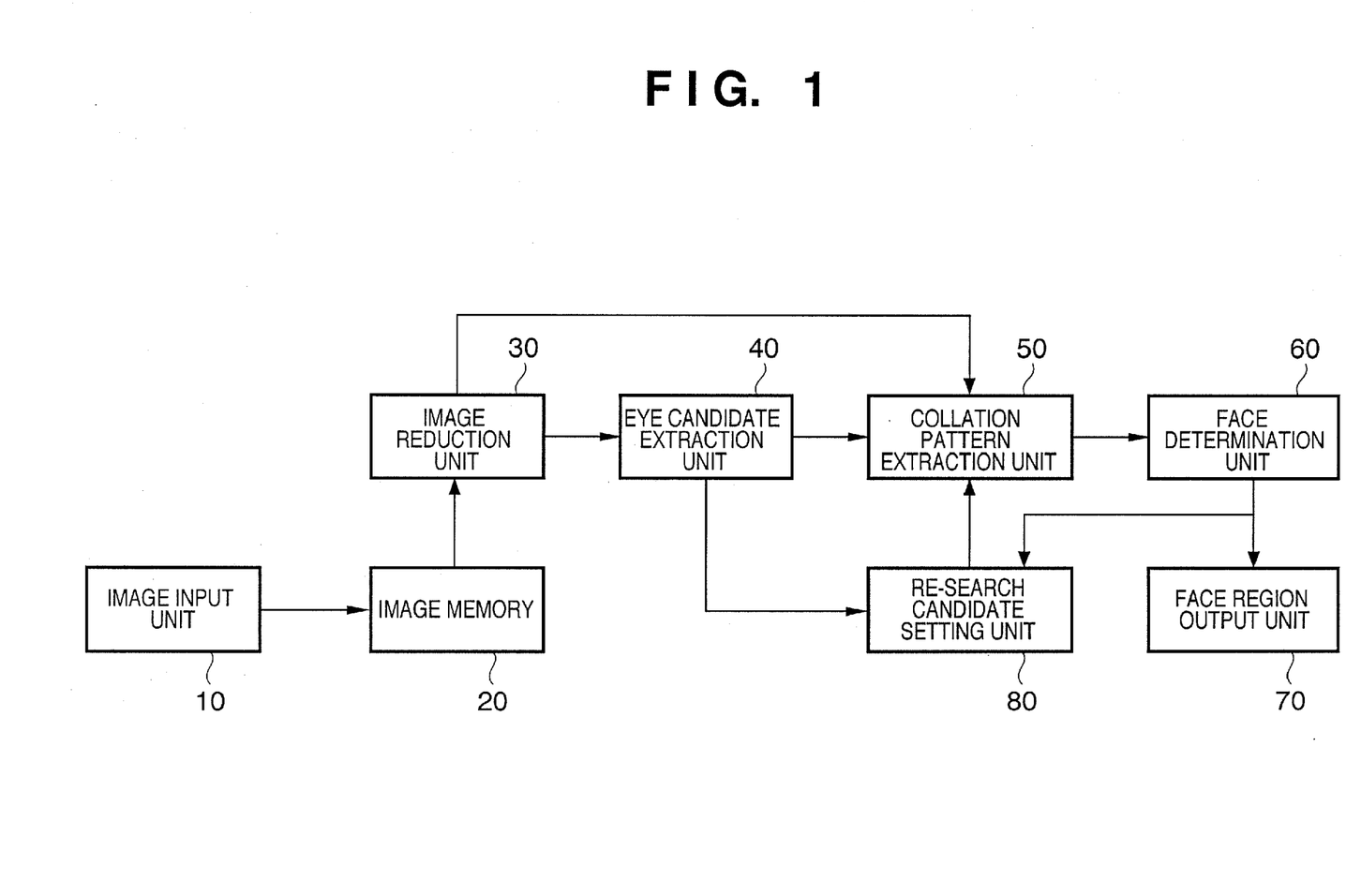
FIG. 1 is a block diagram showing the functional arrangement of a computer which can be applied to an image processing apparatus according to the first embodiment of the present invention.

FIG. 1 is a block diagram showing the functional arrangement of the computer which can be applied to the image processing apparatus according to this embodiment. As shown in FIG. 1, the image processing apparatus according to this embodiment comprises an image input unit 10, image memory 20, image reduction unit 30, eye candidate extraction unit 40, collation pattern extraction unit 50, face determination unit 60, face region output unit 70, and re-search candidate setting unit 80.

The image input unit 10 receives image data output from devices such as a digital still camera, film scanner, and the like, and outputs them to the image memory 20 connected on its output side. Note that the input modes of images are not particularly limited, as described above.

The image memory 20 stores image data output from the image input unit 10.

The image reduction unit 30 generates a luminance image formed by luminance components of image data received from the image memory 20. Then, the image reduction unit 30 generates a plurality of reduced-scale images by recursively reducing the generated luminance image. The generated reduced-scale images (if the original luminance image generated based on the image data received from the image memory 20 is interpreted as a 1/1 reduced-scale image, this original can be included in the reduced-scale images) are sequentially output to the eye candidate extraction unit 40 as the next stage.

The eye candidate extraction unit 40 extracts regions (eye candidate regions) as eye candidates from each reduced-scale image received from the image reduction unit 30, and calculates the positions of the extracted regions.

The collation pattern extraction unit 50 receives the eye candidate regions on each reduced-scale image calculated by the eye candidate extraction unit 40, and extracts, using the two positions, a predetermined region on this reduced-scale image as a pattern to be collated used in the subsequent processing. Such processing is applied to respective reduced-scale images received from the image reduction unit 20.

The face determination unit 60 executes processing for determining if the pattern to be collated received from the collation pattern extraction unit 50 is a face pattern or a non-face pattern.

The face region output unit 70 outputs the pattern to be collated which is determined as the face pattern by the face determination unit 60.

The re-search candidate setting unit 80 is activated when the face determination unit 60 determines that the pattern to be collated is not a face pattern. The re-search candidate setting unit 80 sets neighboring regions in the neighborhood of the positions of the two eye candidate regions which are used by the collation pattern extraction unit 50 to extract the pattern to be collated, and searches the set neighboring regions for the positions of the eye candidate regions again. The positions of the two eye candidate regions acquired as a result of search are output to the collation pattern extraction unit 50.

The aforementioned units operate as, e.g., functions of the CPU 201.

Figure 2:
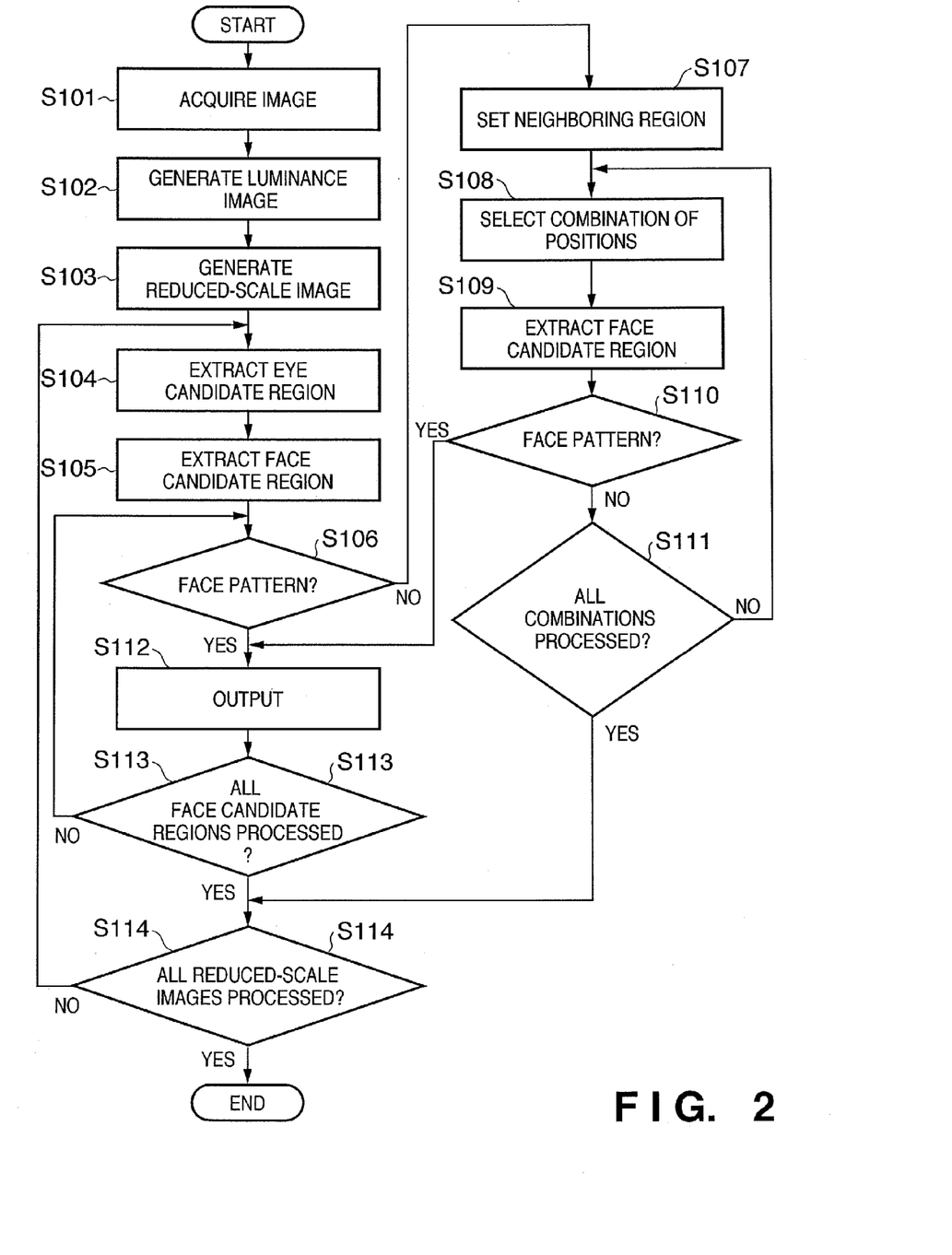
FIG. 2 is a flowchart of processing for detecting an object included in an image.

The processing implemented when the CPU 201 operates as the units shown in FIG. 1, i.e., the processing for detecting an object included in an image will be described below using FIG. 2 that shows the flowchart of this processing. Note that programs and data for making the CPU 201 execute the processing according to the flowchart of FIG. 2 are saved in the external storage device 207 (or a storage medium readable by the storage medium drive device 208). When these programs and data are loaded as needed onto the RAM 202 under the control of the CPU 201, and the CPU 201 executes the processing using these programs and data, the computer can implement respective processes to be described below.

When image data is input from the external storage device 207 or from an external device via the I/F 209, the CPU 201 temporarily stores the image data in an area corresponding to the image memory 20 in the RAM 202 (step S101). When an image input to this computer is compressed, it is decompressed and is then temporarily stored in the RAM 202.

In this embodiment, assume that each of pixels which form the input image data is expressed by R, G, and B. Therefore, the CPU 201 generates, based on the image data stored in the RAM 202 in step S101, an image (luminance image) formed by luminance components of this image, i.e., an image obtained by converting respective pixel values that form the image into luminance values of the pixels (step S102). However, if each of pixels which form the image data stored in the RAM 202 in step S101 is expressed by Y, Cr, and Cb, the CPU 201 generates a luminance image using only Y components in step S102.

Next, the CPU 201 generates a plurality of reduced-scale images by recursively reducing the generated luminance image (step S103). For example, the CPU 201 generates a plurality of reduced-images, i.e., it generates reduced-scale image 2 by multiplying the vertical and horizontal sizes of the luminance image (to be referred to as reduced-scale image 1 for the sake of convenience) generated in step S102 by 1/1.2, generates reduced-scale image 3 by multiplying the vertical and horizontal sizes of reduced-scale image 2 by 1/1.2, and so forth. This is because detection is sequentially made for image data reduced with different sizes each other to cope with detection of eyes with various sizes upon detection of eye candidates in the subsequent processing. Note that the number of reduced-scale images to be generated is not particularly limited.

In step S104 and subsequent steps, processes are applied to each of the generated reduced-scale images. That is, the processes in step S104 and subsequent steps are repeated as many as the number of generated reduced-scale images.

In the following description, the generated reduced-scale images are called like reduced-scale image 1, reduced-scale image 2, ..., reduced-scale image N in descending order of size, and the subsequent processes are applied to reduced-scale image 1 first. Note that the order of images to be selected as an object to be processed is not particularly limited.

The CPU 201 refers to reduced scale image 1 for each of partial regions with a predetermined size, extracts a locally dark region in the referred partial region as a candidate region of an eye (eye candidate region), and acquires the position of the extracted eye candidate region (step S104).

More specifically, the CPU 201 sequentially extracts blocks with a predetermined size (e.g., 5×5 pixels) from luminance image 1 in the vertical and horizontal directions. Note that each block is preferably extracted to slightly overlap neighboring blocks. Next, the CPU 201 sets luminance data in each block as a collation pattern, and collates that pattern with a standard template which is obtained in advance based on the luminance distributions of a large number of eyes. In this case, the CPU 201 makes a correlation operation between the collation pattern and template (a correlation operation normalized by the input luminance is desirable). When the correlation value exceeds a predetermined threshold, the CPU 201 extracts the central position of that block as a position of an eye candidate region (a feature point of an eye). Such processing can be done by a smaller number of arithmetic operations than direct collation of a face since the partial region required for collation is small.

The CPU 201 extracts a face candidate region on luminance image 1 using the position of the eye candidate regions acquired in step S104 (step S105).

Figure 7:
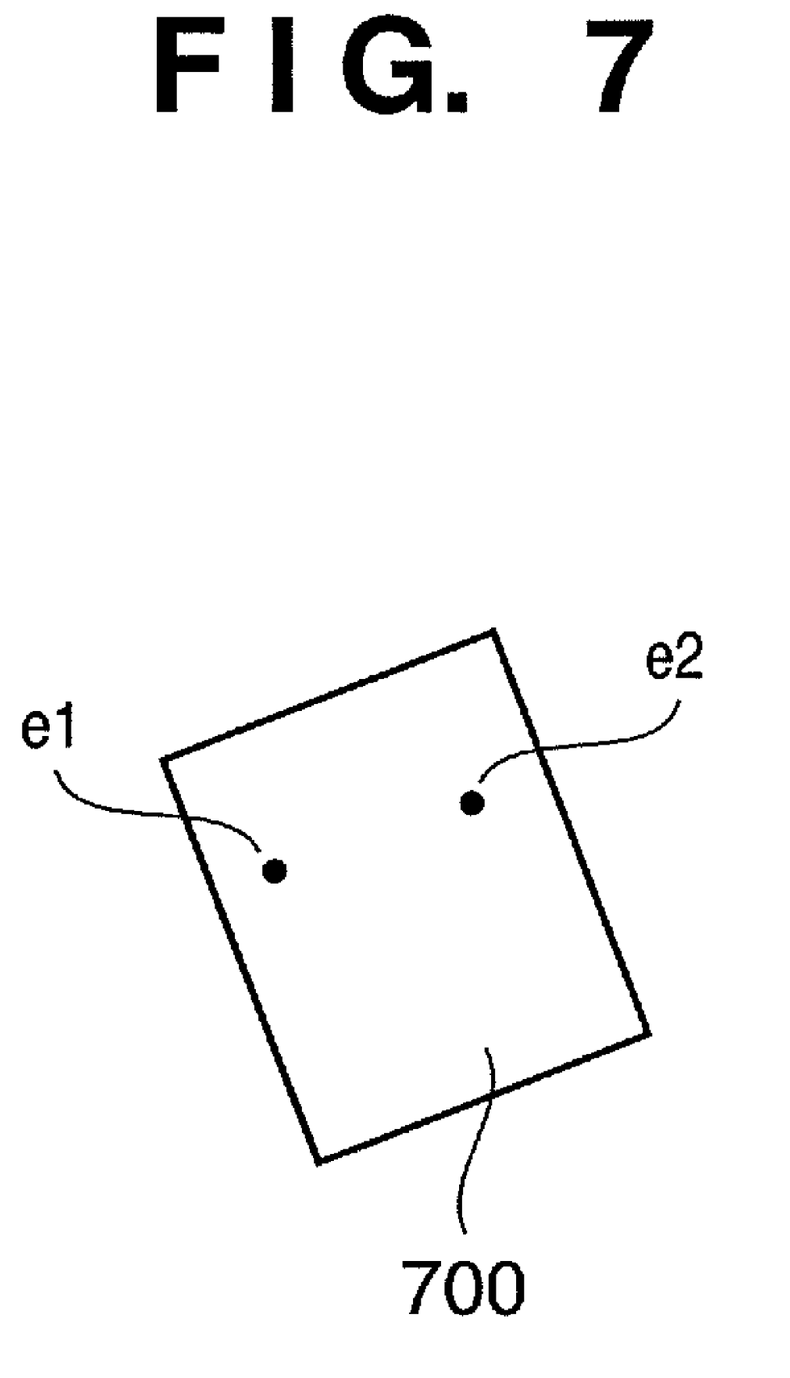
FIG. 7 is a view for explaining processing for setting a face candidate region.

The processing in step S105 will be described in more detail below using FIG. 7. FIG. 7 is a view for explaining the processing for setting a face candidate region. In FIG. 7, e1 and e2 indicate the positions of the eye candidate regions (positions of feature points).

The positions of the eye candidate regions acquired in step S104 are used every two positions. Using these two positions, one rectangle is specified. For example, in case of FIG. 7, a rectangle 700 which has one side (first side) that has a length obtained by multiplying the distance between the two positions e1 and e2 by A in a direction of line that passes through the two positions, and the other side (second side) that has a length obtained by multiplying the distance between the two positions e1 and e2 by B in a direction of line perpendicular to the line that passes through the two positions is specified to have, as its central position, a position by moving the rectangle 700 from the middle point of the two positions by distance C in the direction of the second side. Therefore, if two or more positions of eye candidate regions are available, a plurality of rectangles are set.

A region within this rectangle is a candidate region of a face (face candidate region). In step S105, the CPU 201 specifies this rectangle, and extracts a face candidate region in this rectangle. Note that in FIG. 7, a face candidate region is set to have e1 as the right eye and e2 as the left eye. However, a face candidate region may be set to have e1 as the left eye and e2 as the right eye, or two face candidate regions may be set.

Referring back to FIG. 2, the CPU 201 checks if a luminance pattern of the face candidate region extracted in step S105 is a face pattern (step S106). More specifically, the CPU 201 executes processing for normalizing the luminance distribution of respective pixels in the face candidate region extracted in step S105. For example, the CPU 201 performs luminance correction such as histogram smoothing or the like. This is to suppress deterioration of precision of object collation since object patterns to be sensed have different luminance distributions depending on their illumination conditions. The CPU 201 then checks if the normalized luminance pattern is a face pattern.

Figure 4:
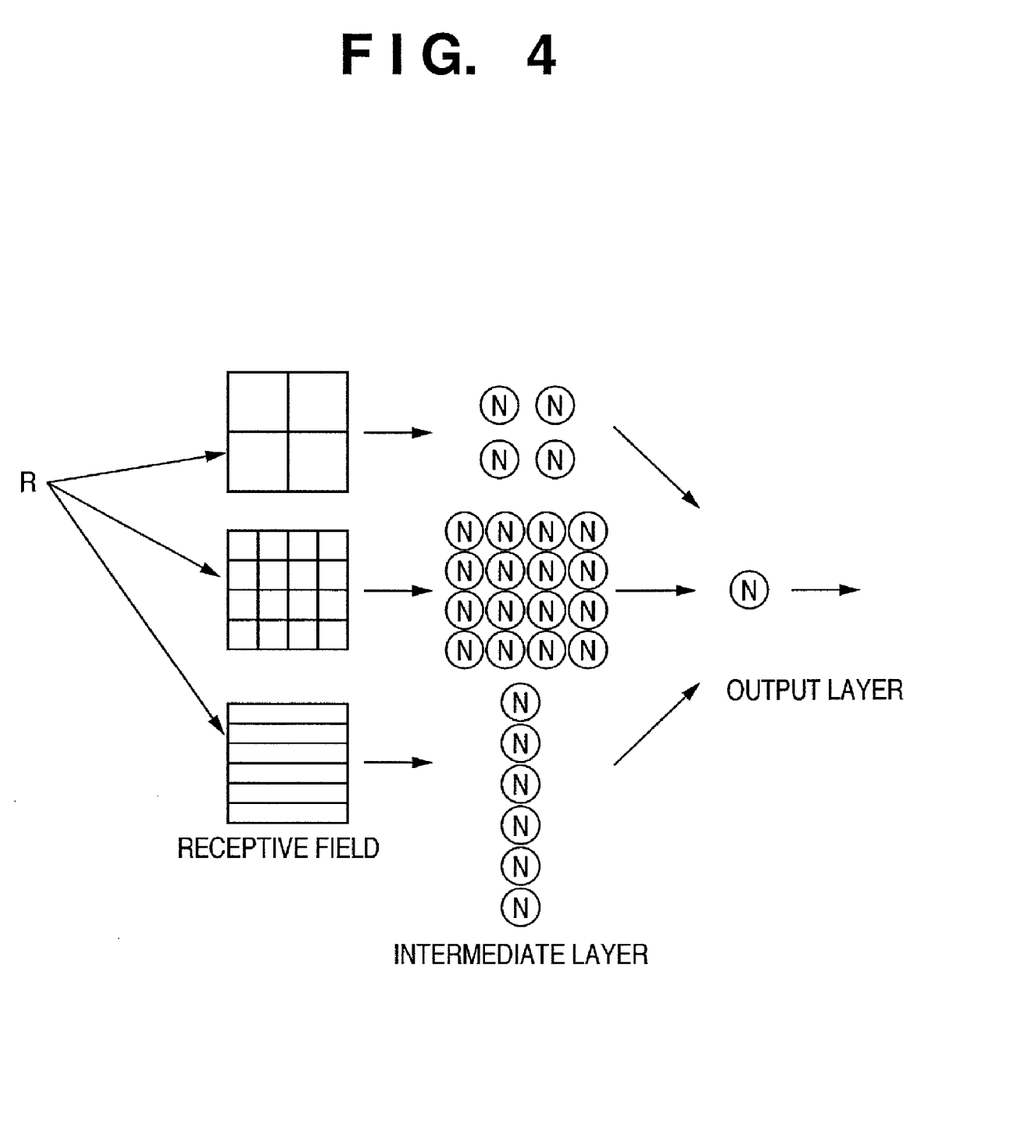
FIG. 4 is a view showing the operation of neural networks used to identify a pattern in a predetermined region.

FIG. 4 is a view showing the operation of neural networks used to identify a pattern in a predetermined region. In FIG. 4, reference symbol R denotes a region to be identified on an image. In this embodiment, this region R is further divided into regions by three different methods, as shown in FIG. 4, so as to obtain receptive fields to respective neurons (indicated by N). The luminance distributions of the divided regions are input to respective neurons to obtain outputs of intermediate layers. Then, the outputs from the respective neurons of the intermediate layers are input to that of an output layer, thus obtaining a final output.

Figure 5:
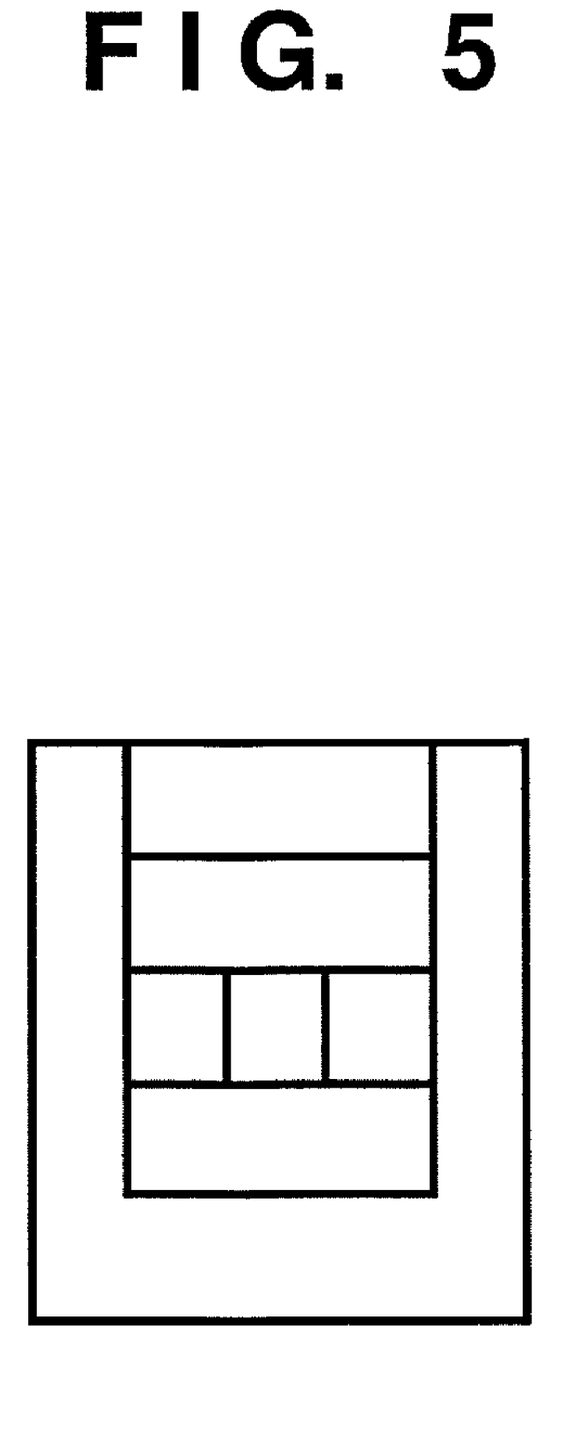
FIG. 5 is a view showing respective parts of a face.

Note that each neuron makes a product-sum operation of a weight obtained in advance by learning and the luminance distribution, and an arithmetic operation based on a sigmoid function of the product-sum operation result. In this embodiment, the output value of the neuron in the output layer is compared with a predetermined threshold. When the output value exceeds the threshold, that pattern is determined as a face pattern; otherwise, that pattern is not determined as a face (non-face) (for details and a learning method of the neural networks, please refer to "Neural network-based face detection", IEEE TRANSACTIONS ON PATTERN ANALYSIS AND MACHINE INTELLIGENCE, VOL. 20, NO. 1, JANUARY 1998). Note that the processing for determining whether or not the pattern obtained by normalizing the luminance distribution is a face pattern (that in step S106) is not limited to such specific processing, as long as a predetermined input pattern undergoes object determination and a value that can discriminate a face or non-face pattern is output. For example, receptive fields may be set to divide a pattern into partial regions as inputs based on the positional relationship among the outline of a face, eyes, nose, mouth, and cheekbones, as shown in FIG. 5. FIG. 5 shows respective parts of a face.

The present invention is not limited to determination using the neural networks. For example, a method based on AdaBoost proposed by the report of Viola and Jones, which is entitled "Rapid Object Detection using a Boosted Cascade of Simple Features", Proceedings of the IEEE Conference on Computer Vision and Pattern Recognition, 2001, may be used.

If it is determined that the face candidate region extracted in step S105 is a face pattern (strictly speaking, if it is determined that the pattern obtained by normalizing the luminance distribution of this face candidate region is a face pattern), the flow advances to step S112, and the CPU 201 outputs image data in this face candidate region as face region data (step S112). The output destination is not particularly limited. For example, the face region data may be output to a predetermined area in the RAM 202 or to the external storage device 207 or an external device which can make data communications via the I/F 209.

The CPU 201 checks if the processes in step S106 and subsequent steps have been applied to all the face candidate regions (step S113). If the face candidate regions to be processed still remain, the processes in step S106 and subsequent steps are applied to the next face candidate region to be processed. On the other hand, if the processes in step S106 and subsequent steps are complete for all the face candidate regions, the flow advances to step S114 to check if the aforementioned processes have been applied to all reduced-scale images (step S114). If the reduced-scale images to be processed still remain, the flow returns to step S104 to repeat the processes in step S104 and subsequent steps for the next reduced-scale image. In this embodiment, since reduced-scale image 1 has been processed, the processes will be applied to the next reduced-scale image 2.

On the other hand, if it is determined that the face candidate region extracted in step S105 is not a face pattern (strictly speaking, if it is determined that the pattern obtained by normalizing the luminance distribution of this face candidate region is not a face pattern), the flow advances to step S107 to execute subsequent processes.

Note that the face candidate region extracted in step S105 is often not determined as a face pattern due to only deviation of the eye positions in the face pattern, although it is a face pattern in practice. Therefore, in this embodiment, even if it is determined that the face candidate region extracted in step S105 is not a face pattern, the positions of the eye candidate regions in this face candidate region are re-examined, and it is checked again if a face candidate region specified by the re-examined positions of the eye candidate regions is a face pattern. With this processing, face detection can be performed by allowing the positional deviations of the eyes independently of the directions of the right and left eyes of an object.

Figure 8A:
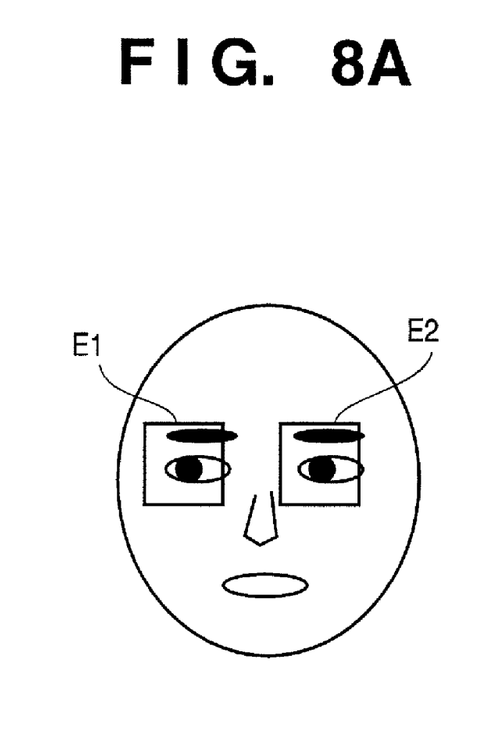
FIGS. 8A to 8C are views for explaining processing in steps S107 to S109.

The CPU 201 sets neighboring regions (E1 and E2 in FIG. 8A) in the neighborhood of the neighborhood of the positions of the two eye candidate regions in the face candidate region extracted in step S105, respectively, as shown in FIG. 8A (step S107). FIG. 8A shows a setting example of the neighboring regions.

More specifically, a region with a predetermined size, which includes the position of one eye candidate region and has that position as the center is set as a neighboring region for the one eye candidate region, and a region with a predetermined size, which includes the position of the other eye candidate region and has that position as the center is set as a neighboring region for the other eye candidate region.

Figure 8B:
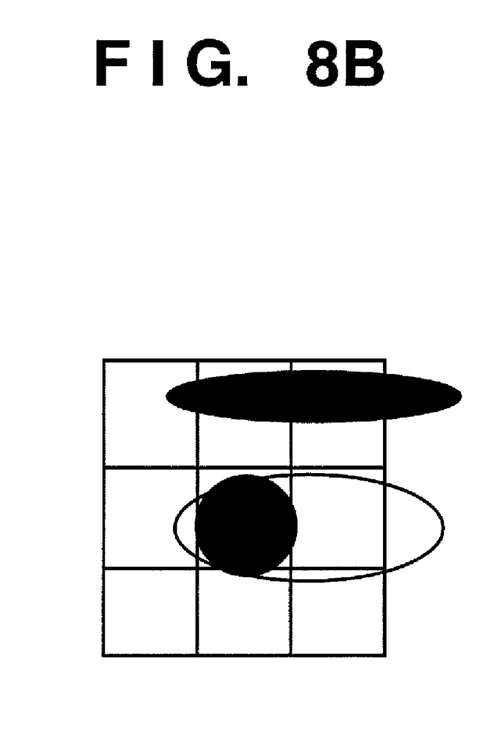

In step S108, the CPU 201 executes processing to be described below. The CPU 201 divides each neighboring region into a plurality of rectangles. FIG. 8B shows an example of 3×3 rectangles obtained by dividing the neighboring region E1 (E2).

For the sake of convenience, respective rectangles (nine rectangles) in the neighboring region E1 will be referred to as B11, B12, . . . , B19 hereinafter. On the other hand, respective rectangles (nine rectangles) in the neighboring region E2 will be referred to as B21, B22, . . . , B29 hereinafter.

Therefore, in step S108 the CPU 201 selects a combination of one rectangle position (a central position of each rectangle) in the neighboring region E1 and that in the neighboring region E2. That is, in this case, there are 81 different combinations, i.e., a combination of positions of B11 and B21, a combination of positions of B11 and B22, and so forth. However, since a combination of the central rectangles of these neighboring regions has already been processed, the CPU 201 sequentially selects from 80 different combinations.

Figure 8C:
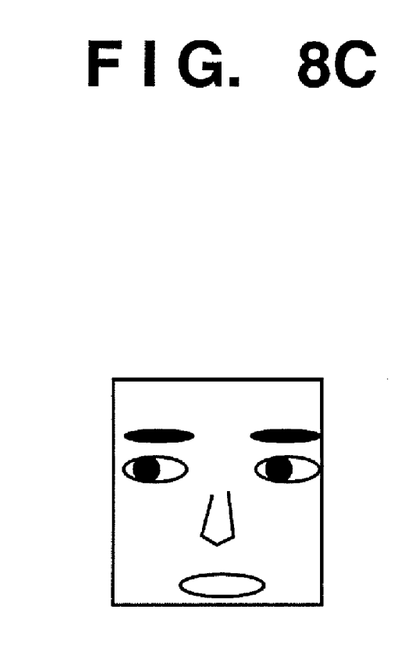

Since the CPU 201 executes the same processing as in step S105 using one position and the other position in the combination selected in step S108 as positions of two eye candidate regions, it specifies a face candidate region and extracts that face candidate region (step S109). FIG. 8C shows an example of the extracted face pattern.

As in step S106, the CPU 201 checks if this face candidate region is a face pattern (step S110). If that face candidate region is a face pattern, the flow advances to step S112 to output this face pattern; otherwise, the flow advances to step S111 to check if all the combinations have been processed in step S109. If the combinations to be processed still remain, the flow returns to step S108 to select the next combination, and the subsequent processes are applied to the selected combination.

When output face candidates overlap each other on the image in the aforementioned repetitive processing, a face pattern of a face candidate region with a highest output value of the neuron in the output layer of the neural networks used in step S106 or step S110 is output.

As described above, according to this embodiment, even when the eye positions deviate since the eyes of an object look in various directions, a face region can be detected from an image with high precision.

In this embodiment, eyes are used as partial features of a face of an object, but other features may be used.

Second Embodiment

In this embodiment, whether or not a face candidate region is a face pattern is determined in two stages. For that reason, in the functional arrangement of a computer which can be applied to an image processing apparatus according to this embodiment, the face determination unit 60 in the functional arrangement shown in FIG. 1 is separated into two units (first face determination unit 61 and second determination unit 62), as shown in FIG. 9.

Figure 9:
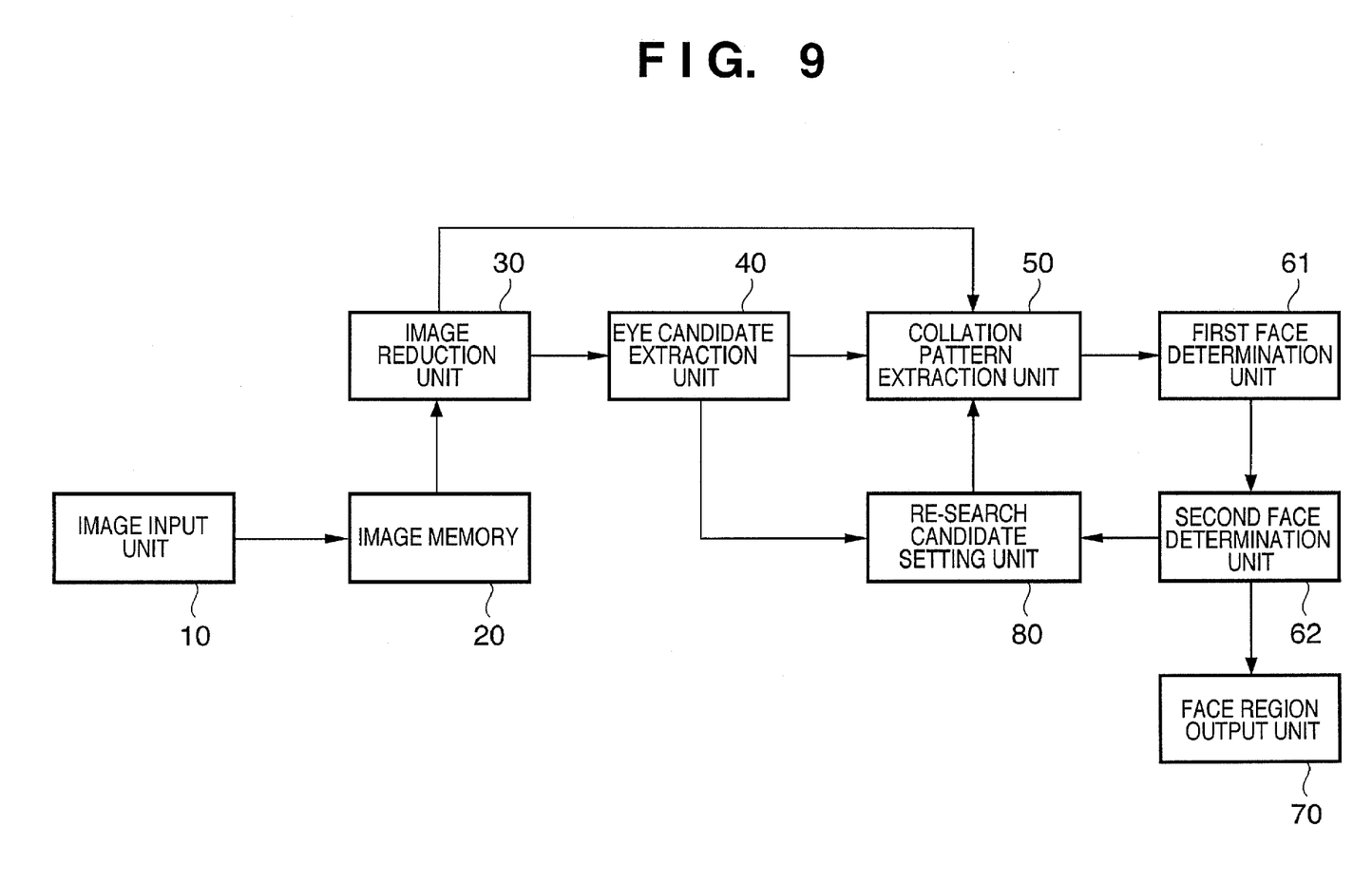
FIG. 9 is a block diagram showing the functional arrangement of a computer which can be applied to an image processing apparatus according to the second embodiment of the present invention.

FIG. 9 is a block diagram showing the functional arrangement of a computer which can be applied to the image processing apparatus according to this embodiment. Note that the same reference numerals in FIG. 9 denote the same parts as in FIG. 1, and a description thereof will be omitted.

The face determination processing in two stages will be described below.

Figure 6D:
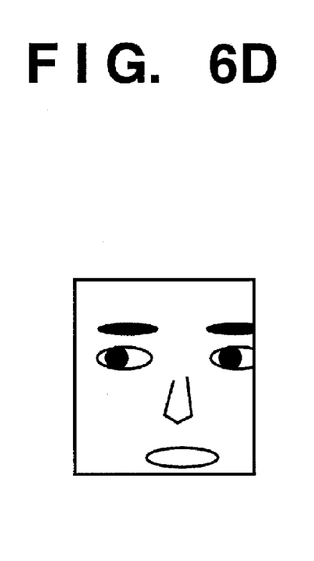

A first face determination unit 61 executes basically the same processing as that of the face determination unit 60. The first face determination unit 61 has learned in advance to relatively widely detect face patterns (not to determine that a face pattern is not a face). Therefore, it is considered upon learning that the pattern shown in FIG. 6D is determined as a face. Hence, only face candidate regions which are determined as face patterns by the first face determination unit 61 are significant in the subsequent processes. In other words, only face candidate regions determined as face patterns by the first face determination unit 61 become an object to be processed in the subsequent processes. That is, even when an image includes a large number of regions, since those which are determined not as face patterns by the first face determination unit 61 do not become objects to be processed in the subsequent processes, the overall processing efficiency and face detection precision can be improved.

A second face determination unit 62 has learned in advance to detect only a face pattern with a relatively high degree of certainty. The second face determination unit 62 executes the same processing as in the face determination unit 60 for face candidate regions determined as face patterns by the first face determination unit 61, and checks if each face candidate region is a face pattern. The subsequent processes are the same as those in the first embodiment.

With this processing, the number of face candidate regions which need undergo the processes in step S107 and subsequent steps in FIG. 2 can be reduced, and a face search can be efficiently conducted.

Note that this embodiment can be configured so that the processing by the first face determination unit 61 is implemented using relatively simple arithmetic operations while attaching importance on the processing time, and that by the second determination unit 62 is implemented by more complicated arithmetic operations while attaching importance on determination precision, thus conducting a face search more efficiently.

As described above, in the method of determining a face by setting a face candidate using two eyes selected from eye candidates, and extracting the set face region as an image pattern, the method which makes determination by setting a re-search candidate in the neighboring regions of the eyes after a non-face pattern is determined once is robust against any deviations of the detection positions of dark parts that occur when the line of sight of an object deviates or illumination or any extraction position deviations of eyes that occur when eyebrows and frames of spectacles are mistaken for eyes.

Other Embodiments

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-204735, filed Jul. 13, 2005, which is hereby incorporated by reference herein in its entirety.

What is claimed is:

1. An image processing method for detecting a predetermined object from an image, comprising: a detection step of detecting positions of feature candidate regions as candidates of two partial features of the predetermined object from the image; a first determination step of determining whether or not a first object candidate region, which is specified by positions of two of the feature candidate regions detected in the detection step, is a region of the predetermined object; a setting step of setting neighboring regions in a neighborhood of the positions of the two of the feature candidate regions, if the first object candidate region is determined not to be the region of the predetermined object in the first determination step; a selection step of sequentially selecting a first position in one of the neighboring regions and a second position in another one of the neighboring regions so as to generate all combinations of the first and second positions; a second determination step of determining whether or not a second object candidate region, which is specified by one of the combinations of the first and second positions as positions of two feature candidate regions, is the region of the predetermined object and, if not, repeating said second determination step using a different combination of the first and second positions as positions of two feature candidate regions; and an output step of outputting data of the first object candidate region if the first object candidate region is determined to be the region of the predetermined object, and outputting data of the second object candidate region if the second object candidate region is determined to be the region of the predetermined object.

2. The method according to claim 1, wherein the predetermined object is a human face.

3. The method according to claim 1, wherein the partial features of the predetermined object are eyes.

4. The method according to claim 1, further comprising:
a generation step of generating a luminance image which is formed by luminance components of the image, and
wherein the positions of the feature candidate regions is detected from the generated luminance image in the detection step.

5. The method according to claim 4, wherein the generation step includes a step of generating a plurality of reduced-scale images by recursively reducing the luminance image, and
the generation step includes a step of detecting the positions of the feature candidate regions from each of the generated plurality of reduced-scale images.

6. The method according to claim 1, wherein the first determination step includes a step of determining whether or not there is a possibility that the first object candidate region is an object region, and furthermore determining whether or not the first object candidate region is an object region if it is determined that there is the possibility that the first object candidate region is an object region.

7. A computer-readable storage medium which stores a program which causes a computer to execute an image processing method of claim 1.

8. An image processing apparatus for detecting a predetermined object from an image, said apparatus comprising: a detection unit adapted to detect positions of feature candidate regions as candidates of two partial features of the predetermined object from the image; a first determination unit adapted to determine whether or not an object candidate region which is specified by positions of the two feature candidate regions detected by said detection unit is a region of the predetermined object; a setting unit adapted to set neighboring regions in a neighborhood of the positions of the feature candidate regions if the object candidate region is determined not as the region of the predetermined object by said first determination unit; a selection unit adapted to select a first position in one of the neighboring regions and a second position in another one of the neighboring regions so as to generate all combinations of the first and second positions; a second determination unit adapted to determine whether or not an object candidate region which is specified by one of the combinations of the first and second positions as positions of feature candidate regions, is the region of the predetermined object and, if not, to repeat the determination by said second determination unit using a different combination of the first and second positions as positions of feature candidate regions; and output unit adapted to output data of some or all of object candidate regions which are determined as the region of the predetermined object by said first or second determination unit, respectively.

* * * * *